United States Patent [19]

Wallace et al.

[11] Patent Number: 5,083,812
[45] Date of Patent: Jan. 28, 1992

[54] SUSPENSION WITH STIFFENER ARM

[75] Inventors: Donovan B. Wallace; William C. Pierce, both of Muskegon, Mich.

[73] Assignee: Neway Corp., Muskegon, Mich.

[21] Appl. No.: 526,305

[22] Filed: May 21, 1990

[51] Int. Cl.$^5$ ............................................. B60G 11/28
[52] U.S. Cl. ..................................... 280/713; 280/688
[58] Field of Search ............... 280/713, 711, 702, 688, 280/683, 724, 725, 723; 267/256

[56] References Cited

U.S. PATENT DOCUMENTS

| | | | |
|---|---|---|---|
| 2,180,860 | 11/1939 | Brown | 267/256 |
| 3,406,983 | 10/1968 | Masser | 267/256 |
| 3,547,215 | 12/1970 | Bird | 280/713 |
| 4,341,397 | 7/1982 | Morimura | 280/724 |
| 4,773,670 | 9/1988 | Raidel | 280/713 |

Primary Examiner—Charles A. Marmor
Assistant Examiner—Karin Tyson
Attorney, Agent, or Firm—Varnum, Riddering, Schmidt & Howlett

[57] ABSTRACT

A air spring suspension system includes ground-engaging wheels mounted on an axle housing which is secured to trailing arms pivotally mounted at one end to the frame of the vehicle for vertical swinging movement relative thereto. The other ends of the trailing arms are connected by a transverse beam which extends between them. The beam is connected with the trailing arms by bushed articulating joints which permit the trailing arms to move with respect to each other. A stiffener arm is mounted at one end to each trailing arm by a bushed connection, and rigidly secured at another end to the transverse beam near to where the transverse beam is connected to the trailing arm. The bushed connection between the stiffener arm and the trailing arm provides limited articulation, and resists roll forces imparted to the suspension when the vehicle turns to provide increased stiffness at low rates of roll.

44 Claims, 3 Drawing Sheets

SUSPENSION WITH STIFFENER ARM

BACKGROUND OF THE INVENTION

1. Field of the Invention

The present invention relates generally to suspension systems for automotive vehicles, and more particularly to stabilizers for improving lateral stability in suspension systems.

2. Scope of the Prior Art

Suspension systems for heavy-duty use in commercial vehicles typically employ air springs, and are used in single-axle units or in tandem arrangements of two or more axles. The axles can be either driven or non-driven.

An air spring is essentially an air-inflated bag and of itself has insignificant lateral stability. Therefore, in air spring suspensions it is necessary to provide mechanical means for controlling all lateral forces and force components on the suspension and its various members.

A typical suspension is shown in U.S. Pat. No. 3,140,880 to Masser in which air springs are disposed between two vertically swinging control arms to which the axle is also attached. One feature of that suspension is that much of the lateral force is controlled by a strong, relatively rigid attachment between the axle and the control arms.

It was found desirable to provide for greater flexibility of movement between the axle and the control arms, while still maintaining sufficient lateral stability. An improved suspension which has come into common use is shown in Masser U.S. Pat. No. 3,406,983 in which a transverse beam, connected to the control arms, transmits the spring load between the control arms and the vehicle frame. This beam provides a torsion member which resists differential vertical swinging movements of the control arms. One or more joints are provided in the beam or its connections to the control arms and these joints provide articulation, to a limited degree, of the control arms with respect to the beam. The joints incorporate elastomeric material which distort resiliently when the joints are twisted. This elastomeric material is dimensioned, configured and distributed so as to provide a generally predetermined resistance to each of the movements of the control arms with respect to the beams.

Attempts have been made to provide additional resistance to lateral forces which cause the frame to "roll" relative to the axle, without interfering with the vertical forces controlled by the springs themselves. Such rolling typically occurs, for example, by the centrifugal and acceleration forces acting on the frame when the vehicle turns. Prior art attempts to provide additional roll resistance include the addition of stabilizer bars, roll bars, or torsion bars secured between the suspension and the frame, or brackets extending between the axle and the frame. Additional roll resistance can also be provided by stiffening the flexible connection between the control arms and the beam.

Such improvements, however, may nevertheless affect the handling and ride of the vehicle, and transfer the load caused by the lateral forces to the frame. Such systems are frequently more complex, having many moving components and may also have limited application, especially where the vehicle center of gravity is higher than a predetermined level.

SUMMARY OF THE INVENTION

The invention relates to a vehicle suspension having improved roll resistance. The suspension comprises a pair of longitudinally extending, vertically swingable trailing arms for mounting at one end to the sides of a vehicle. An air spring is operably interposed between another end of the trailing arms and the frame. An axle is mounted to the trailing arms. A transverse beam extends between and is connected to the trailing arms. Means are provided on the transverse beam for permitting articulation of the trailing arms with respect to each other.

The improvement, according to the invention, comprises a stiffener arm having one end connected to at least one of the trailing arms at a point remote from the pivotable connection with the sides of the vehicle and another end connected to the transverse beam for providing an increased resistance to roll moments generated by deflection of the frame relative to the axle means. Also, articulation means are provided on the stiffener arm for permitting articulation of the trailing arm with respect to the beam.

Preferably, the articulation means comprises an articulated connection between the stiffener arm and either the trailing arm or the beam. In one aspect of the invention, the articulated connection is between the stiffener arm and the trailing arm. In such case, the other end of the stiffener arm is typically rigidly connected to the transverse beam. Alternately, the articulation means can be provided between portions of the stiffener arm.

In another aspect of the invention, the stiffener arm comprises a pair of oppositely disposed plates spaced apart from each other and connected at upper portions thereof by a web to form a downwardly facing channel.

The stiffener arm is preferably disposed between the trailing arm and the transverse beam to effect articulation of the stiffener arm about a longitudinal axis generally parallel to the trailing arm. To this end, the stiffener arm preferably has a collar, and the articulated connection comprises a bushing received in the collar and mounted to the trailing arms, typically by a bolt extending through the bushing and the trailing arm.

In yet another aspect of the invention, the spring is mounted to a platform, and the platform is mounted to the stiffener arm with the stiffener arm being secured to the transverse beam near the trailing arm. Other aspects of the invention will be apparent in the accompanying drawings and specification.

BRIEF DESCRIPTION OF THE DRAWINGS

The invention will now be described with reference to the following drawings, in which.

DETAILED DESCRIPTION OF THE DRAWINGS

In the discussion which follows, the terms "frontwardly", "rearwardly", "upwardly", and "downwardly" shall have reference to the vehicle as it normally sits on the ground. "Frontwardly" is in the direction towards the front of the vehicle (to the left in FIG. 2), and "rearwardly" is toward the rear of the vehicle. "Upwardly" is the direction away from the ground, and "downwardly" is toward the ground.

Figure 1:
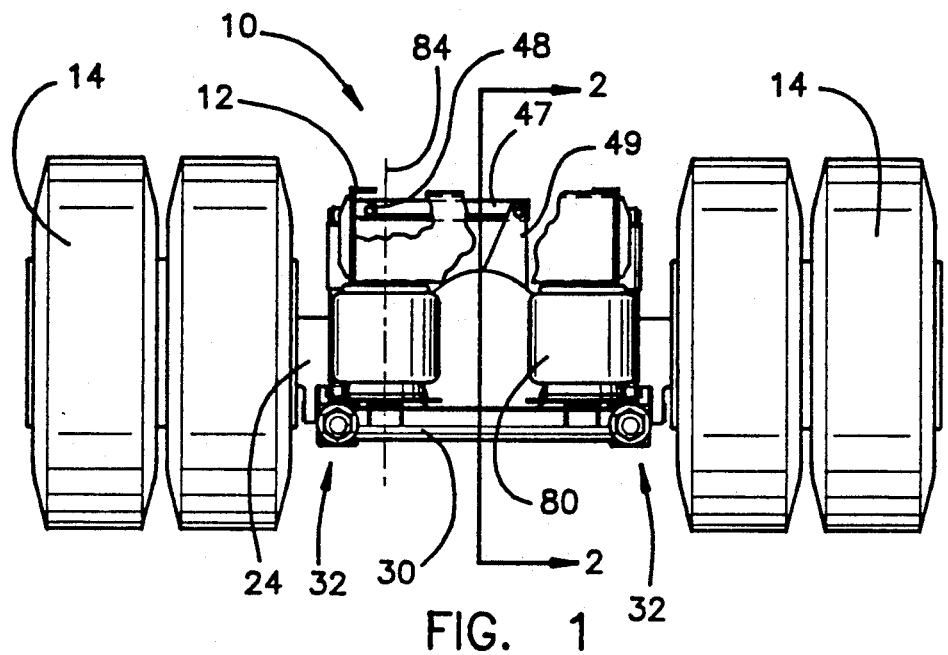
FIG. 1 is an elevational end view illustrating a suspension which incorporates the present invention.
Figure 2:
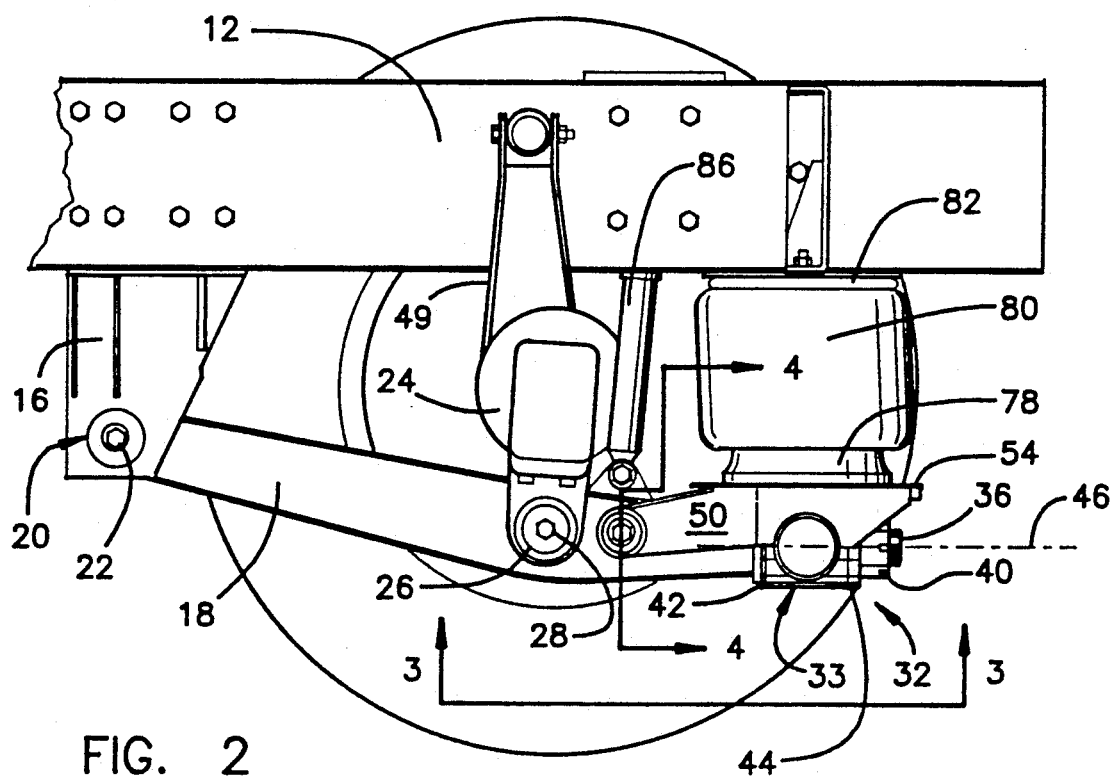
FIG. 2 is a side elevation, partly in section, taken along line 2—2 of FIG. 1.

Shown in the drawings is a vehicle 10 having a frame 12 from which ground-engaging wheels 14 are suspended. The frame may include a cross brace (shown fragmentarily in FIG. 1 to reveal additional detail). Referring first to FIGS. 1 and 2, the frame 12 has depending brackets 16 adjacent each side of the vehicle, and rigid trailing arms 18 are pivotally secured to these brackets 16 so that the arms can swing vertically relative to the frame. The arms 18 are secured to the bracket 16 at a bushed pivot 20 which is secured to the bracket by a pivot bolt 22. It will be understood that although the illustrated embodiment shows the arms 18 extending rearwardly, the invention scope includes a structure wherein the arms extend frontwardly or both frontwardly and rearwardly from the pivot 20.

Each wheel 14 is mounted on an axle housing 24 having an axle bracket 26 rigidly anchored thereto as, for example, by welding. Each bracket 26 is connected to a trailing arm 18 by a bushed pin 28. While in the illustrated embodiment, only a single axle 24 in corresponding suspension is shown, it will be understood that multiple axles, and multiple suspensions may be disposed relative to the frame, typically in tandem. Further, where two or more axles are so disposed, any one or all of them may be driven. Appropriate connections between the axle housings and drive shafts (not shown) are provided in conventional manner, and form no part of the invention.

A transverse beam 30 extends between each pair of rigid trailing arms 18 and is connected thereto by beam connections 32. Each beam connection 32 comprises a bushing 33 formed of a sleeve 34 at the end of the beam which forms an outer pivot member. A pin 36 extends from the end of the trailing arm 18 to form an inner pivot member, and a resiliently distortable material such as an elastomer is tightly confined between the sleeve 34 and the pin 36. A nut 40 on threaded end of the pin 36 secures the bushing 33 between a pair of washers 42, 44 on the pin 36. The axis of the pivot thus formed coincides substantially with the longitudinal centerline 46 of the trailing arm 18. The beam connection 32 thus facilitates relative swinging of the beam 30 and the trailing arm 18 about the pivot axis; the elastomer bushing 33 provides some torsional resistance to such swinging.

Figure 3:
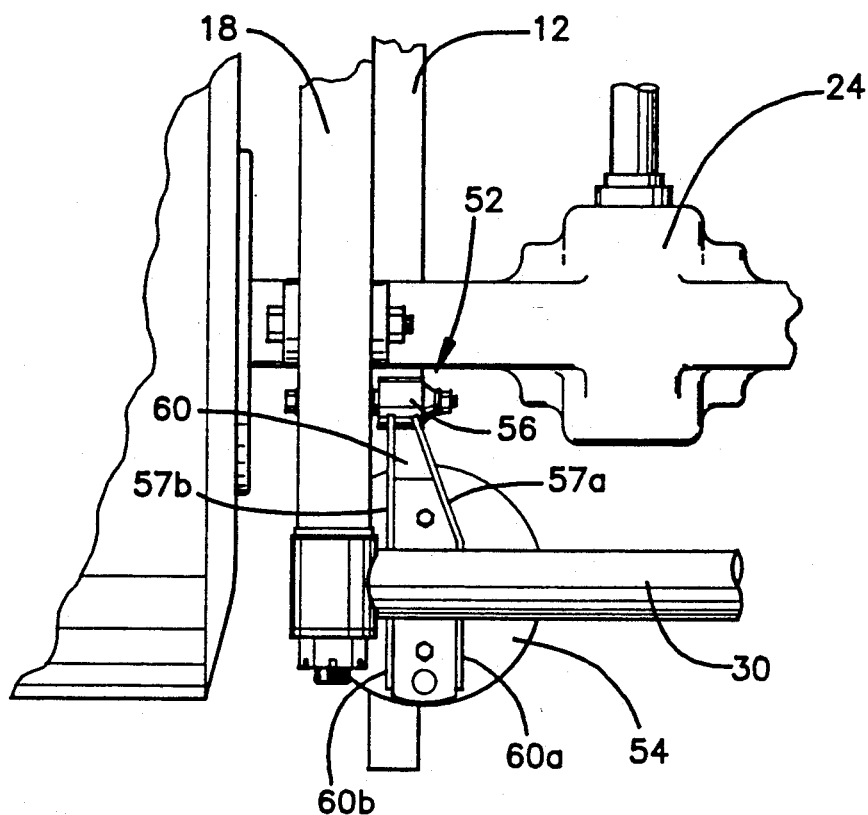
FIG. 3 is a fragmentary bottom view on line 3—3 of FIG. 2.

Additional lateral stability is obtained by a track bar 47 extending between the axle housing 24 and the frame 12. One end of the bar 47 connects to the frame at pivot 48 and the other end connects pivotally to a bracket 49 rigidly secured to the axle housing. In accordance with the invention and as shown more clearly in FIGS. 2 and 3, a stiffener arm 50 connects to and extends between a trailing arm 18 and the transverse beam 30. One end of the stiffener arm is connected to the trailing arm 18 by a stiffener connection 52, and the other end of the arm 50 is rigidly connected to the transverse beam 30 as by welding. The arm 50 also supports a platform 54 adjacent each end of the beam 30. It will be understood that a stiffener arm 50 may be provided between each trailing arm 18 and the transverse beam 30 in the manner illustrated in FIGS. 2 and 3.

The stiffener arm 50 comprises a collar 56 and a pair of stiffener plates 57a, 57b rigidly secured thereto as by welding. The stiffener plates are secured at another edge thereof to the transverse beam 30 and to the platform 54. A box plate 60 extends between the stiffener plates 57a, 57b and the platform 54 to form a generally downwardly facing channel-shaped arm 50 and provide additional structural integrity to the arm 50.

Rearwardly extending gussetlike portions 60a, 60b extend over the transverse beam 30, rearwardly thereof, and are rigidly secured thereto and to the platform 54. The gussetlike portions 60a, 60b need not be integral with the stiffener plates 57a, 57b, but may be discrete elements to provide support to the platform 54.

Figure 4:
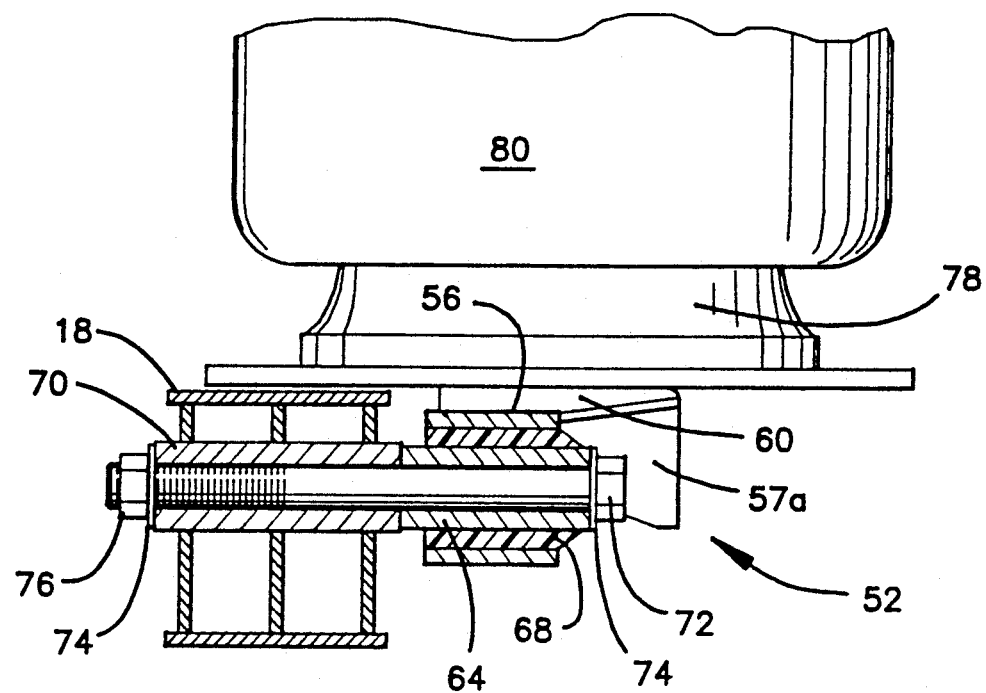
FIG. 4 is a fragmentary, partly sectional view taken on line 4—4 of FIG. 2.

As shown best in FIG. 4, the stiffener connection 52 comprises a bushing core 64, and a resiliently distortable material such as an elastomer 68 tightly confined between the bushing core 64 and the collar 56. A steel sleeve 70 extends through the trailing arm 18 at a point rearward of the axle bracket 26 and forward of the beam connection 32. A bolt 72 passes through the bushing core 64 and the steel sleeve 70 and tightly secures them together with washers 74 and a nut 76. It will be apparent that the stiffener connection 52 provides limited articulation between the stiffener arm 50 and the trailing arm 18. It will be apparent that the stiffener arm 50 is rigidly secured to the transverse beam 30 near the beam connection 32 at the trailing arm 18. Thus, the stiffener arm is permitted limited articulation about an axis which is generally offset from the longitudinal axis 46 of the arm 18.

Referring again to FIGS. 1 and 2, the platform 54 supports a lower end portion 78 of an air spring 80. An air spring mounting plate 82 secures an upper portion of the air spring to the frame 12. The air springs 80 are positioned as far as practicable from the longitudinal centerline of the vehicle in order to obtain maximum roll stability. The air springs have a substantial diameter so that they can utilize relatively low pressures. In order to avoid interference with the wheels, the centerlines 84 of the air springs typically must be disposed laterally inwardly of the longitudinal centerlines 46 of the control arms. The transverse beam 30 and the stiffener arm 50 cause the load on the load center 84 of the spring to be transferred outwardly through the beam connection 32 and the stiffener connection 52 to the centerline of the trailing arm 18.

Rebound of the springs 80 is controlled by shock absorbers 86 connected between the frame 12 and the trailing arms 18 as shown. It will be understood that the shock absorbers may be connected between the frame 12 and the axle housing 24, or, alternatively, between the frame 12 and the transverse beam 30.

In use, assuming the vehicle 10 is moving straight ahead and that wheels 14 at opposite sides of the vehicle roll over similar irregularities, there is no significant differential movement between any pair of control arms, and forces in the suspension are controlled primarily by air springs 80 and the bushed pivot 20 and bushed pin 28 between the trailing arm 18 and axle housing 24, respectively.

Let it now be assumed that the vehicle is encountering some road conditions which cause differential vertical swinging movement of the two rigid trailing arms 18 attached to the common axle housing 24. This condition occurs when the vehicle rounds a curve so that it tends to lean to one side (rolls). It also occurs when one wheel 14 traverses a bump or depression while the other wheel passes an unlike surface. Were it not for the presence of the transverse beam 30 and its connections to the trailing arm 18 by means of the beam connections 32 and the stiffener arms 50, the pivotal connections at 20 and 28 would provide insufficient roll stability for the vehicle.

However, the beam connections 32 strongly resist the tendency of the trailing arms 18 to rock relative to the transverse beam 30 about an axis generally longitudinal of the transverse beam. Thus, differential vertical swinging movement of the trailing arms 18 stresses the transverse beam 30 in torsion, which thereby resists such differential vertical swinging.

When the vehicle rounds a corner, forces are exerted on the suspension which tend to swing the control arms in a horizontal direction laterally of the frame 12. This tends to distort the transverse beam 30 and the trailing arms 18 out of their normal rectangular relation. The track bar 47 primarily resists this movement, but the beam connections 32 also resist this tendency. The beam connections 32, however, yield slightly to permit a limited amount of such movement. The beam 30 may be stressed either in tension or compression at this time depending upon the specific conditions encountered. Further, as the vehicle turns, roll is induced in the frame relative to the axle housing which places further stresses on the suspension. The resulting roll moment is measurable and is a function of the resistance afforded by the suspension.

The stiffener arm, being rigidly secured to the beam 30, transfers a portion of the load on the beam 30 to the stiffener connection 52 which also yields slightly. However, the moment is caused about an axis through the stiffener connection 52 which is offset from the longitudinal centerline of the trailing arm 18. This structure causes an increased resistance to the roll force on the vehicle as measured by the torque applied to the beam 30 at a lesser degree of roll than the resistance provided by the beam connection 32 alone.

Figure 5:
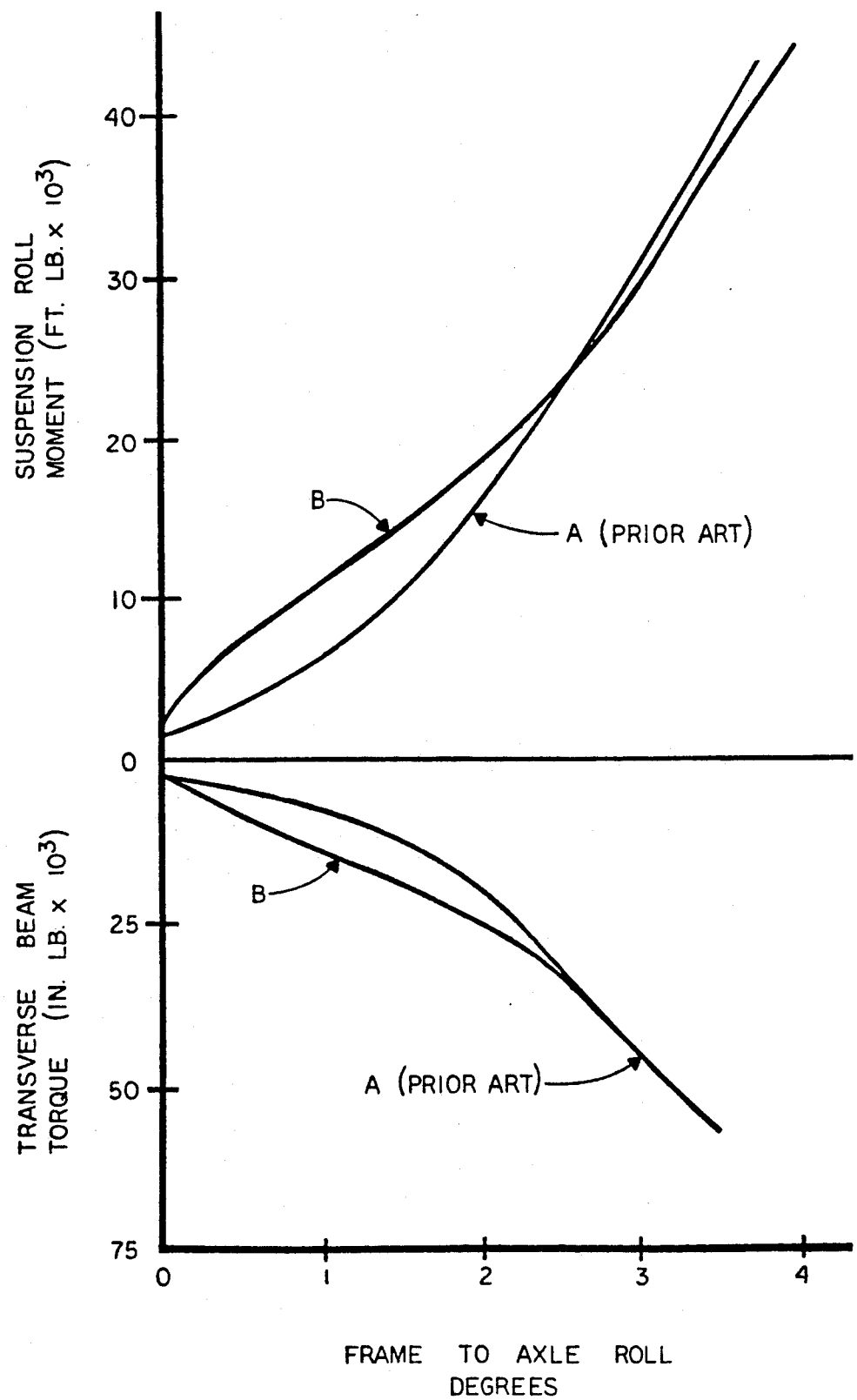
FIG. 5 is a graph which illustrates increased stiffness provided by the invention at a lower rate of roll.

FIG. 5 graphically depicts the change in roll moment of the suspension against the degree of articulation or roll between the frame and axle. FIG. 5 also illustrates the change in torque on the transverse beam 30 simultaneously. Line A illustrates the curve obtained with a prior art suspension system similar to that in FIG. 1 without stiffener arms and where the principal resistance is provided by the beam connection 32 above. Line B illustrates the curves obtained from an identically dimensioned system with stiffener arms added in accordance with the invention. It will be apparent that at a roll of less than 2 ½ degrees on the tested system, a higher roll moment was obtained with the stiffener arms, simultaneously passing a greater torque to the transverse beam, than with the transverse beam alone. This greater torque improves the handling ability of the vehicle at low-roll angles and tends to avoid oversteering to compensate for low-torque resistance to roll.

Accordingly, a suspension constructed in accordance with the invention will provide an increased stiffness against roll at a lower roll rate with improved handling characteristics of the vehicle, without affecting roll stiffness at higher displacements. These benefits can be provided at lower cost by maintaining the reaction to the roll solely within the suspension components, without transferring load to the frame or other portions of the vehicle.

Reasonable variation and modification are possible within the scope of the foregoing specification and drawings without departing from the essence of the invention which is defined by the accompanying claims.

The embodiments of the invention in which an exclusive property or privilege is claimed are defined as follows:

1. In a vehicle having a frame with ground-engaging wheels suspended therefrom through an axle connected with a pair of longitudinally extending, vertically swingable trailing arms mounted at a pivot point thereof to the sides of the vehicle, a spring operably interposed between the trailing arms and the frame, a transverse beam extending between and connected to said trailing arms, and means on said transverse beam for permitting articulation of said trailing arms with respect to each other, the improvement comprising:
   a stiffener arm having one end connected to at least one of said trailing arms at a point remote from the pivot point thereof and another end connected to said transverse beam for providing an increased resistance to roll moments generated by deflection of said frame relative to said axle; and
   articulation means on said stiffener arm for permitting articulation of said one of said trailing arms with respect to said beam.

2. A vehicle according to claim 1 wherein said articulation means comprises an articulated connection between said stiffener arm and said one of said trailing arms and said beam.

3. A vehicle according to claim 2 wherein said articulated connection is between said one end of the stiffener arm and said one of said trailing arms.

4. A vehicle according to claim 3 wherein said other end of said stiffener arm is rigidly connected to said transverse beam.

5. A vehicle according to claim 4 wherein said stiffener arm comprises a pair of oppositely disposed plates spaced apart from each other and connected at upper portions thereof by a web to form a downwardly facing channel.

6. A vehicle according to claim 5 wherein said one end of said stiffener arm has a collar and said articulated connection comprises a bushing received in said collar and mounted to said one of said trailing arms.

7. A vehicle according to claim 6 wherein said bushing is mounted to said one of said trailing arms by a bolt extending through said bushing and said one of said trailing arms.

8. A vehicle according to claim 6 wherein said spring is mounted to a platform, and said platform is mounted to said stiffener arm, said stiffener arm being secured to said transverse beam near to said one of said trailing arms.

9. A vehicle according to claim 8 wherein said stiffener arm is disposed between said one of said trailing arms and said transverse beam to effect articulation of said stiffener arm about an axis generally offset from said one of said trailing arms.

10. A vehicle according to claim 1 wherein said stiffener arm is disposed between said one of said trailing arms and said transverse beam to effect articulation of said stiffener arm about an axis generally offset from said one of said trailing arms.

11. A vehicle according to claim 10 wherein said articulation means comprises an articulated connection between said stiffener arm and said one of said trailing arms and said beam.

12. A vehicle according to claim 11 wherein said articulated connection is between said one end of the stiffener arm and said one of said trailing arms.

13. A vehicle according to claim 12 wherein said other end of said stiffener arm is rigidly connected to said transverse beam.

14. A vehicle according to claim 13 wherein said stiffener arm comprises a pair of oppositely disposed plates spaced apart from each other and connected at upper portions thereof by a web to form a downwardly facing channel.

15. A vehicle according to claim 14 wherein said one end of said stiffener arm has a collar and said articulated connection comprises a bushing received in said collar and mounted to said one of said trailing arms.

16. A vehicle according to claim 15 wherein said bushing is mounted to said one of said trailing arms by a bolt extending through said bushing and said one of said trailing arms.

17. An assembly for a suspension adapted to support a vehicle frame on ground-engaging wheels comprising:
- a pair of rigid trailing arms, each adapted to be pivotably mounted at a pivotable point thereof to the frame in generally parallel relation for vertical swinging movement about the pivotable point relative to the frame;
- a beam extending between and connected to the trailing arms, said beam having a joint for permitting articulation of the trailing arms with respect to each other;
- an air spring mounted to said trailing arms and said beam and adapted to be mounted to said frame to cushion the swinging movement of the trailing arms;
- an axle mounted to and extending between the trailing arms and adapted to carry the ground-engaging wheels; and
- a stiffener arm having one end connected to at least one of said trailing arms at a point remote connected to at least one of said trailing arms at a point remote from the pivot point thereof, and another end connected to said beam to resist a roll moment on the suspension generated by deflection of the frame relative to the axle, said stiffener arm having a joint to permit articulation between said one of said trailing arms and said transverse beam.

18. An assembly according to claim 17 wherein said joint is disposed between said one end of the stiffener arm and said one of said trailing arms.

19. An assembly according to claim 18 wherein said another end of said stiffener arm is rigidly connected to said transverse beam.

20. An assembly according to claim 19 wherein said stiffener arm comprises a pair of oppositely disposed plates spaced apart from each other and connected at upper portions thereof by a web to form a downwardly facing channel.

21. An assembly according to claim 20 wherein said one end of said stiffener arm has a collar and said joint comprises a bushing received in said collar and mounted to said one of said trailing arms.

22. An assembly according to claim 21 wherein said bushing is mounted to said one of said trailing arms by a bolt extending through said bushing and said one of said trailing arms.

23. A suspension according to claim 21 wherein said spring is mounted to a platform, and said platform is mounted to said stiffener arm, said stiffener arm being secured to said transverse beam near to said one of said trailing arms.

24. An assembly according to claim 23 wherein said stiffener arm is disposed between said one of said trailing arms and said transverse beam to effect articulation of said stiffener arm about an axis generally offset from said one of said trailing arms.

25. An assembly according to claim 17 wherein said stiffener arm is disposed between said one of said trailing arms and said transverse beam to effect articulation of said stiffener arm about an axis generally offset from said one of said trailing arms.

26. In a vehicle suspension comprising a pair of trailing arms, each trailing arm being adapted to be movably connected to a vehicle frame for vertical movement relative thereto, and a beam extending between the trailing arms, each end of said beam being connected to a trailing arm by a joint which permits limited articulation of the beam relative to the trailing arms, a stabilizing device comprising:
- a stiffener arm extending between the beam and at least one of the trailing arms;
- a first connection between one end of the stiffener arm and the beam; and
- a second connection between another end of the stiffener arm and the at least one trailing arm, said second connection being at a point on the trailing arm near the joint;
- at least one of said first and second connections having a bushing for providing limited articulation of said stiffener arm relative to one of the beam and the trailing arm.

27. A stabilizing device according to claim 26 wherein the second connection has a bushing.

28. A stabilizing device according to claim 27 wherein the bushing is offset from the longitudinal axis of the trailing arm.

29. A stabilizing device according to claim 28 wherein the first connection is rigid.

30. A stabilizing device according to claim 29 wherein the stiffener arm has a longitudinal axis generally parallel to the longitudinal axis of the trailing arm.

31. A stabilizing device according to claim 30 wherein the joint has an axis of rotation substantially normal to the axis of rotation of said one of said first and second connections.

32. A stabilizing device according to claim 26 wherein the stiffener arm has a longitudinal axis generally parallel to the longitudinal axis of the trailing arm.

33. A stabilizing device according to claim 26 wherein the first connection is rigid.

34. A stabilizing device according to claim 33 wherein the bushing is offset from the longitudinal axis of the trailing arm.

35. A stabilizing device according to claim 32 wherein the bushing is offset from the longitudinal axis of the trailing arm.

36. An assembly for a suspension adapted to support a vehicle frame on ground-engaging wheels, said assembly comprising:
- a pair of rigid trailing arms, each adapted to be pivotably mounted at a pivotable point thereof to opposite sides of the frame in generally parallel relation for vertical swinging movement about the pivotable point relative to the frame;
- a beam extending between and connected to the trailing arms, said beam having a joint for permitting articulation of the trailing arms with respect to each other;

an air spring mounted to said trailing arms and said beam and adapted to be mounted to said frame to cushion the swinging movement of the trailing arms; and a stiffener arm having one end connected to at least one of said trailing arms at a point remote from the pivotable point thereof and another end connected to said beam for resisting a roll moment on the suspension generated by deflection of the frame relative to the beam, said stiffener arm having a joint to permit articulation between said one of said trailing arms and said beam.

37. An assembly according to claim 36 wherein said connection between said stiffener arm and said one of said trailing arms is not rigid.

38. An assembly according to claim 37 wherein said other end of said stiffener arm is rigidly connected to said transverse beam.

39. An assembly according to claim 38 wherein said stiffener arm comprises a pair of oppositely disposed plates spaced apart from each other and connected at upper portions thereof by a web to form a downwardly facing channel.

40. An assembly according to claim 39 wherein said one end of said stiffener arm has a collar and said joint comprises a bushing received in said collar and mounted to said one of said trailing arms.

41. An assembly according to claim 40 wherein said bushing is mounted to said one of said trailing arms by a bolt extending through said bushing and said one of said trailing arms.

42. An assembly according to claim 40 wherein said spring is mounted to a platform, and said platform is mounted to said stiffener arm, said stiffener arm being secured to said transverse beam near to said one of said trailing arms.

43. An assembly according to claim 42 wherein said stiffener arm is disposed between said one of said trailing arms and said transverse beam to effect articulation of said stiffener arm about an axis generally offset from said one of said trailing arms.

44. An assembly according to claim 36 wherein said stiffener arm is disposed between said one of said trailing arms and said transverse beam to effect articulation of said stiffener arm about an axis generally offset from said one of said trailing arms.

* * * * *